United States Patent
Leffew et al.

(10) Patent No.: US 7,832,955 B1
(45) Date of Patent: Nov. 16, 2010

(54) WINDSHIELD ICE SCRAPER WITH DE-ICING SOLUTION DISPENSER

(76) Inventors: Lisa Leffew, 138 SW. Sea Lion Rd., Port St. Lucie, FL (US) 34953; Timothy Blacknik, 138 SW. Sea Lion Rd., Port St. Lucie, FL (US) 34953

( * ) Notice: Subject to any disclaimer, the term of this patent is extended or adjusted under 35 U.S.C. 154(b) by 247 days.

(21) Appl. No.: 12/082,337

(22) Filed: Apr. 10, 2008

(51) Int. Cl.
*B43K 1/06* (2006.01)

(52) U.S. Cl. ............... 401/265; 401/25; 401/27; 401/37; 401/39; 401/188 R

(58) Field of Classification Search ............ 401/25–27, 401/37, 39, 188 R, 265, 266
See application file for complete search history.

(56) References Cited

U.S. PATENT DOCUMENTS

| | | | |
|---|---|---|---|
| 4,778,301 A | 10/1988 | Sicotte | |
| 4,809,386 A | 3/1989 | Re | |
| D308,139 S | 5/1990 | Viner | |
| D355,529 S | 2/1995 | Tsai | |
| 5,496,123 A * | 3/1996 | Gaither | 401/176 |
| D388,570 S | 12/1997 | Humphries | |
| D407,876 S | 4/1999 | Ward | |
| 6,092,255 A | 7/2000 | Kim | |
| 6,283,656 B1 * | 9/2001 | Jiang | 401/1 |
| 6,990,705 B1 | 1/2006 | Schouten et al. | |
| 2006/0251465 A1 * | 11/2006 | Savoia et al. | 401/266 |

* cited by examiner

*Primary Examiner*—David J Walczak
(74) *Attorney, Agent, or Firm*—Montgomery Patent Design; Robert C. Montgomery

(57) ABSTRACT

An apparatus to aid in the removal of ice buildup from motor vehicle windshields includes an ice scraper with an integral sprayer for dispensing de-icing solution. The handle of the ice scraper contains a reservoir filled with de-icing solution with a spray pump trigger, or battery-powered spraying system, for spraying fluid upon the windshield to aid in the de-icing process. A screw cap, located on the handle, is used to refill the invention when the reservoir is depleted. A detachable snow brush is also provided. The apparatus allows drivers in cold weather climates the ability to efficiently remove ice buildup from their vehicle windshield.

6 Claims, 3 Drawing Sheets

WINDSHIELD ICE SCRAPER WITH DE-ICING SOLUTION DISPENSER

RELATED APPLICATIONS

The present invention was first described on Feb. 14, 2007 in an Official Record of Invention on file at the Offices of Montgomery Patent and Design in Washington, Pa. There are presently no filed, nor currently any co-pending applications, anywhere in the world.

FIELD OF THE INVENTION

This invention relates to a device for retaining and dispensing a de-icing solution within a windshield ice scraper such that said ice scraper is used in conjunction as is necessary to dispense a de-icing solution either manually or automatically within a refillable reservoir.

BACKGROUND OF THE INVENTION

Maintaining a clean automobile windshield is a necessary step in ensuring driving safety. This task is exceedingly difficult in those areas where cold weather seasons exist. While windshield wipers and washing spray do an adequate job of keeping the windshield area clean while driving, they cannot cope with huge ice and snow buildup that accumulates while the vehicle is parked. Situations such as this require the driver to get out an ice scraper and physically remove the buildup. Such a task takes a great deal of time to do properly as the frozen ice and snow is often quite difficult to remove by even the strongest person. Further, it is not a pleasant task in freezing temperatures, as even gloves do not always prevent hands from becoming numb. Thus, many drivers only clear a small spot in the center of the windshield—just enough to see out. This results in a dangerous driving condition, not only for the driver, but for any others who may be sharing the road with them.

Accordingly, a need has arisen for a means by which motorists can easily and quickly remove ice and snow from motor vehicle windshields. The development of the invention herein described fulfills this need.

U.S. Pat. No. 6,990,705, filed by Schouten and Kingsberry, discloses a multifunctional cleaning device having a collapsible handle. This patent does not appear to disclose a windshield ice scraper with an integral fluid container that is capable of dispensing de-icing fluid.

U.S. Pat. No. 6,092,255 filed by Kim discloses a scraper or squeegee with curved blade surfaces. This patent does not appear to disclose a windshield ice scraper with an integral fluid container that is capable of dispensing de-icing fluid.

U.S. Pat. No. D 407,876 filed by Ward discloses a window cleaning set including a dispensing handle. This design patent does not appear to disclose the same ornamental or industrial design characteristics of the instant invention and further does not appear to disclose a disclose a windshield ice scraper that possesses an integral fluid container that dispenses the de-icing fluid through the scraper portion of the apparatus.

U.S. Pat. No. D 388,570 filed by Humphries discloses a combined fluid container and ice scraper. This design patent does not appear to disclose the same ornamental or industrial design characteristics of the instant invention and further does not appear to disclose a disclose a windshield ice scraper that possesses an integral fluid container that dispenses the de-icing fluid through the scraper portion of the apparatus.

U.S. Pat. No. D 355,529 filed by Tsai combined brush ice scraper, squeegee and fluid dispenser. This design patent does not appear to disclose the same ornamental or industrial design characteristics of the instant invention and further does not appear to disclose a disclose a windshield ice scraper that possesses an integral fluid container that dispenses the de-icing fluid through the scraper portion of the apparatus.

U.S. Pat. No. D 308,139 filed by Viner discloses a triple head surface cleaning device. This design patent does not appear to disclose the same ornamental or industrial design characteristics of the instant invention and further does not appear to disclose a disclose a windshield ice scraper that possesses an integral fluid container that dispenses the de-icing fluid through the scraper portion of the apparatus.

U.S. Pat. No. 4,809,386 filed by Re discloses a combined manual implement for window snow removal, ice scraping, washing and drying, for vehicles in general. This patent does not appear to disclose a windshield ice scraper with an integral fluid container that is capable of dispensing de-icing fluid.

U.S. Pat. No. 4,778,301 filed by Sicotte discloses a compact multi-function glass cleaning device. This patent does not appear to disclose a windshield ice scraper that possesses an integral fluid container that dispenses the de-icing fluid through the scraper portion of the apparatus.

The prior art appears to disclose ice scrapers with integral fluid compartments. The prior art does not appear to disclose a windshield ice scraper with de-icing capabilities that possesses a spraying mechanism located on the scraper blades.

SUMMARY OF THE INVENTION

In view of the foregoing disadvantages inherent in the prior art, it has been observed that there is need for a windshield ice scraper with a de-icing solution dispenser that aids in the removal of ice buildup from motor vehicle windshields.

The windshield ice scraper with de-icing solution comprises a conventional ice scrapping blade with an integral spray nozzle for dispensing de-icing solution.

The handle features an internal reservoir filled with de-icing solution, a spray pump trigger that provides a spraying means for the solution onto a windshield, and a removably attachable snow brush.

The windshield ice scraper with de-icing solution may be refilled with de-icing solution through a threaded reservoir cap that is located on the handle.

The windshield ice scraper with de-icing solution comprises: a handle, a snow brush, a first shaft section, a second shaft section, and a scraping blade.

The handle further comprises a reservoir, a spray trigger, a reservoir orifice, and a reservoir cap. The handle provides a cylindrical hard plastic enclosure being covered over with a soft rubber or plastic material that provides a firm grip while using the apparatus. The handle is envisioned to be a hollow vessel with an internal reservoir. The reservoir provides for sealed containment of a volume of de-icing solution via a threaded reservoir orifice and reservoir cap located upon an external surface at a distal end. The reservoir orifice is used to refill the reservoir when the de-icing solution is depleted.

The reservoir is in fluid communication with a manual spray trigger located at a proximal position on the handle. The spray trigger provides a pressure source to said solution using a pressure bulb or pumping device similar to common household cleanser spray bottles. The spray trigger is in fluid communication with an internal coiled plastic tube providing a fluid pressure thereto. The spray trigger is a hinged trigger with a spring return but may be a push button or the like.

The handle further possesses a female threaded region at a distal end to receive the male threaded region portion of a removably attachable snow brush. The snowbrush provides a convenient snow removal appliance and is envisioned to be made using plastic or metal materials providing uni-directional bundled synthetic bristles in an expected manner. The handle also provides a permanent attachment means at a proximal end to a first shaft section.

The first shaft section comprises a tubular member being slidingly engaged therewith a second shaft section in a telescoping fashion. Both the first and second shaft sections comprise a tubular construction with an outside diameter of the second shaft section particularly sized to fit snuggly and slidingly therein the first shaft section. The clamping collar provides a locking and length adjustment means to the apparatus and preferably comprises a common threaded collar type device. Various types of tube securing designs common in the industry may be provided such as, but not limited to, a friction collar or a cam lever. The first shaft section and second shaft section are made of resilient light-weight waterproof plastic or metal thin-wall tubing.

The second shaft section further provides a permanent attachment means thereto the scraping blade. The first and second shaft sections provide a routing conduit means for a flexible solvent tube therein to a spray nozzle portion of the scraping blade. The scraping blade is envisioned to be a plastic injection molded component comprising an integrally molded spray nozzle located at a front lower surface.

The spray nozzle provides dispensing of de-icing solution in a fanned dispersing pattern when pressurized by the spray trigger. The scraping blade is envisioned to be a conventional straight-edged and fan-shaped plastic blade.

The majority of the components used in the invention are made of plastic in an injection molding process; materials such as, but not limited to, painted steel, stainless steel, or other metal of lightweight durable materials may be used.

The windshield ice scraper with de-icing solution, in an alternate embodiment, possesses a motorized pump. The motorized pump embodiment provides similar function and construction to that of the preferred embodiment with particular enhancements to enable automatic dispensing of the de-icing solution by pressing a push button switch.

The motorized pump embodiment comprises a motorized pump, a battery/compartment, and a pushbutton switch. The motorized pump provides a pumping force thereto the de-icing solution propelling said de-icing solution toward the spray nozzle. The motorized pump is envisioned to be a miniaturized DC motor and pump assembly similar to those used in automotive windshield wash reservoirs comprising fluid inlet and outlet orifices and being powered therefrom one (1) or more DC batteries. The motorized pump is to be mounted internal thereto the second shaft section in fluid communication thereto the coiled tube and in electrical communication with said DC battery/compartment and the push button switch.

The battery/compartment is to be made using similar materials as the second shaft section being flush thereto an outer cylindrical surface of said second shaft section being affixed using a common threaded fastener in an expected manner.

The push button comprises a single contact closure type device with a spring return, thereby providing an electrical closure of an activation circuit, thereby providing a DC current thereto the motorized pump.

The motorized pump embodiment is mounted internal to the first shaft section portion and possesses a simple DC circuit comprising one (1) or more rechargeable or disposable batteries providing a direct current thereto a single contact closure push button switch further comprising a spring return, thereby providing a momentary activation means thereto said DC current. Upon manual activation of said switch, DC power is conducted thereto a motor portion of the motorized pump which provides sufficient torque and revolutions per minute (RPM) thereto an integral fluid pump so as to propel de-icing solution. The circuit described herein also comprises electrical connections, electrical components, wiring, and the like in an expected manner.

The windshield ice scraper with de-icing solution may be used by removing the reservoir cap; filling the reservoir by pouring a desired volume of de-icing solution into the reservoir as required; replacing the reservoir cap by turning in a clock-wise direction until tightened; installing the snow brush by engaging and turning the male threaded region thereinto the female threaded region of the handle, if not previously installed; adjusting the overall length of the apparatus using the clamp collar; loosening the clamp collar by grasping and turning; extending the second shaft section portion as desired; tightening the clamp collar; grasping the handle in an expected manner; removing ice and snow from a windshield using the scraping blade portion; dispensing and dispersing the de-icing solution by repeatedly depressing the spray trigger as needed, thereby pressurizing and pumping the de-icing solution from the reservoir to the spray nozzle; scraping the windshield using the scraping blade in conjunction with the dispersion of de-icing solution until all ice and snow is removed from said windshield; utilizing the apparatus as needed until the de-icing solution is depleted therefrom the reservoir; refilling said reservoir as described above; and, benefiting from improved visibility and time savings using the present invention.

The windshield ice scraper with de-icing solution, in its alternate motorized pump embodiment may be used by loading a fresh set of rechargeable or disposable batteries therein the battery compartment; dispensing and dispersing the de-icing solution by depressing the push button switch, thereby activating the motorized pump in turn propelling de-icing solution from the reservoir to the spray nozzle.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
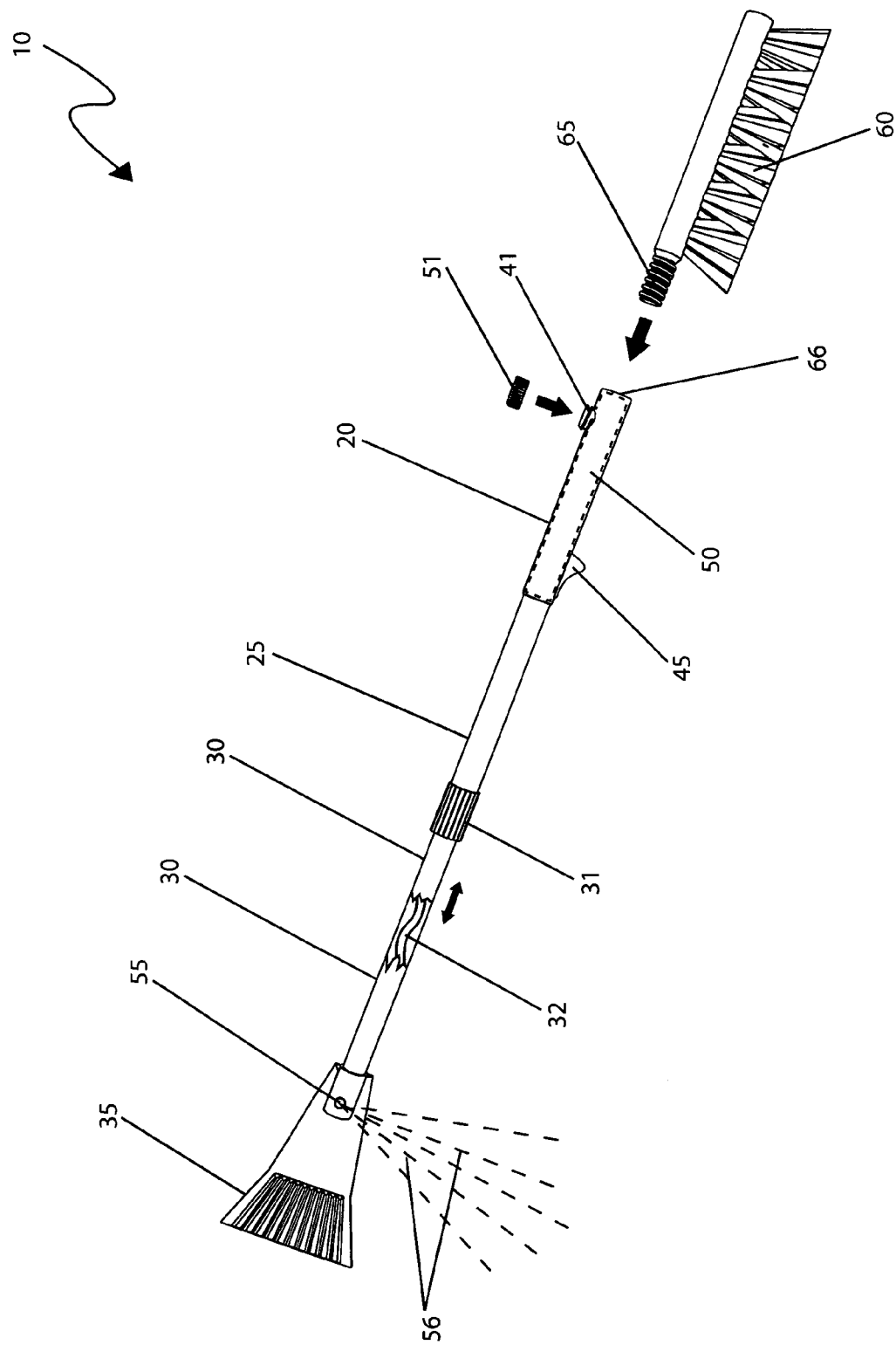
FIG. 1 is a perspective view of a windshield ice scraper with a de-icing solution dispenser 10 and a detachable brush portion 60, according to a preferred embodiment of the present invention.

DESCRIPTIVE KEY 10 windshield ice scraper with de-icing solution dispenser
20 handle
25 first shaft section
30 second shaft section
31 clamping collar
32 tube
35 scraping blade 41 filling orifice
45 spray trigger
50 reservoir
51 reservoir cap
55 spray nozzle
56 de-icing solution
60 brush
65 male threaded region
66 female threaded region
70 motorized pump embodiment
71 motorized pump
72 battery/compartment
73 push button switch

DETAILED DESCRIPTION OF THE PREFERRED EMBODIMENT

Figure 2:
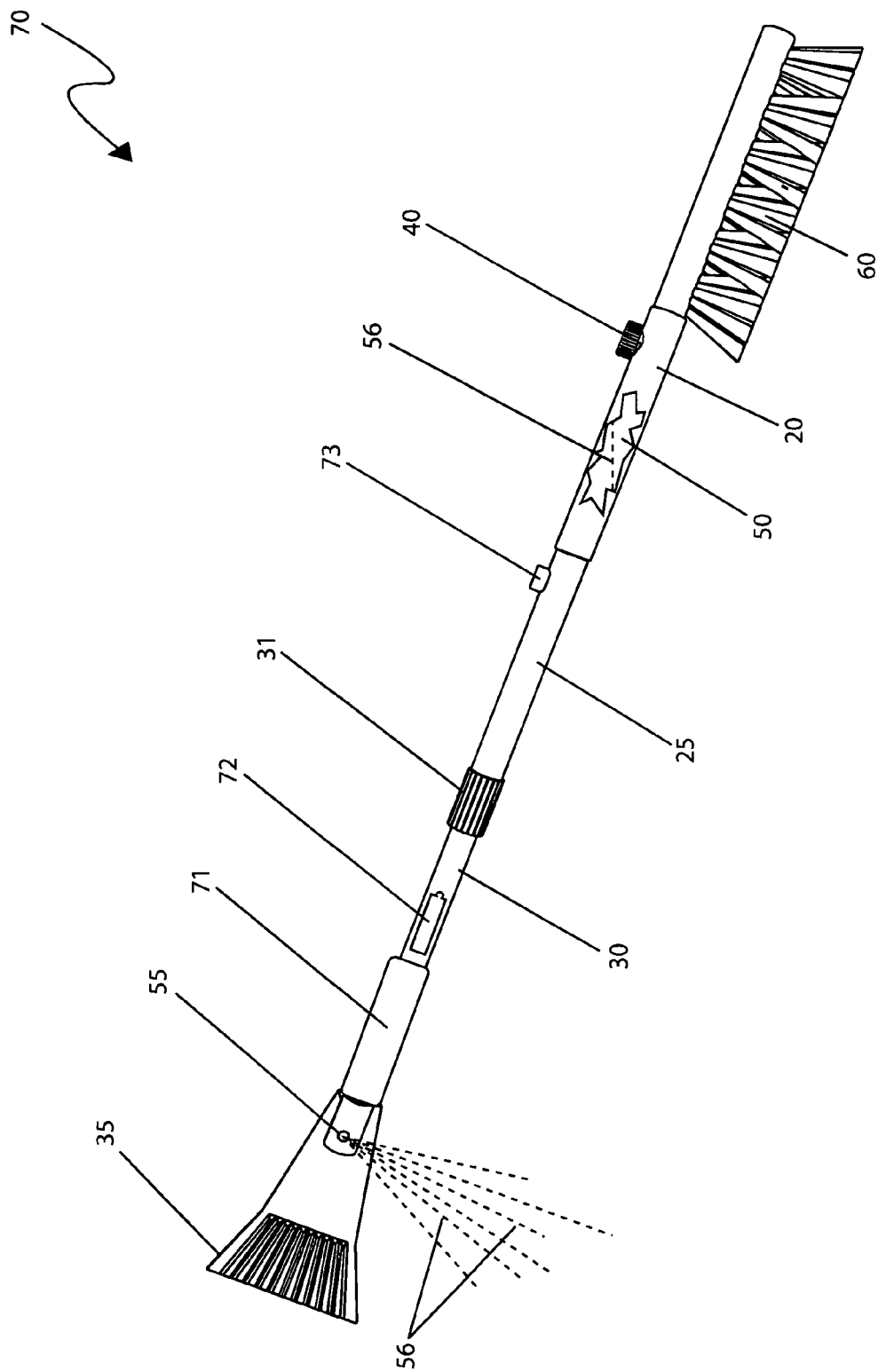
FIG. 2 is a perspective view of a motorized pump embodiment 70 of a windshield ice scraper with a de-icing solution dispenser 10, according to an alternate embodiment of the present invention; and, FIG. 3 is an electrical block diagram of a motorized pump embodiment 70 of a windshield ice scraper with a de-icing solution dispenser 10, according to an alternate embodiment of the present invention.
Figure 3:
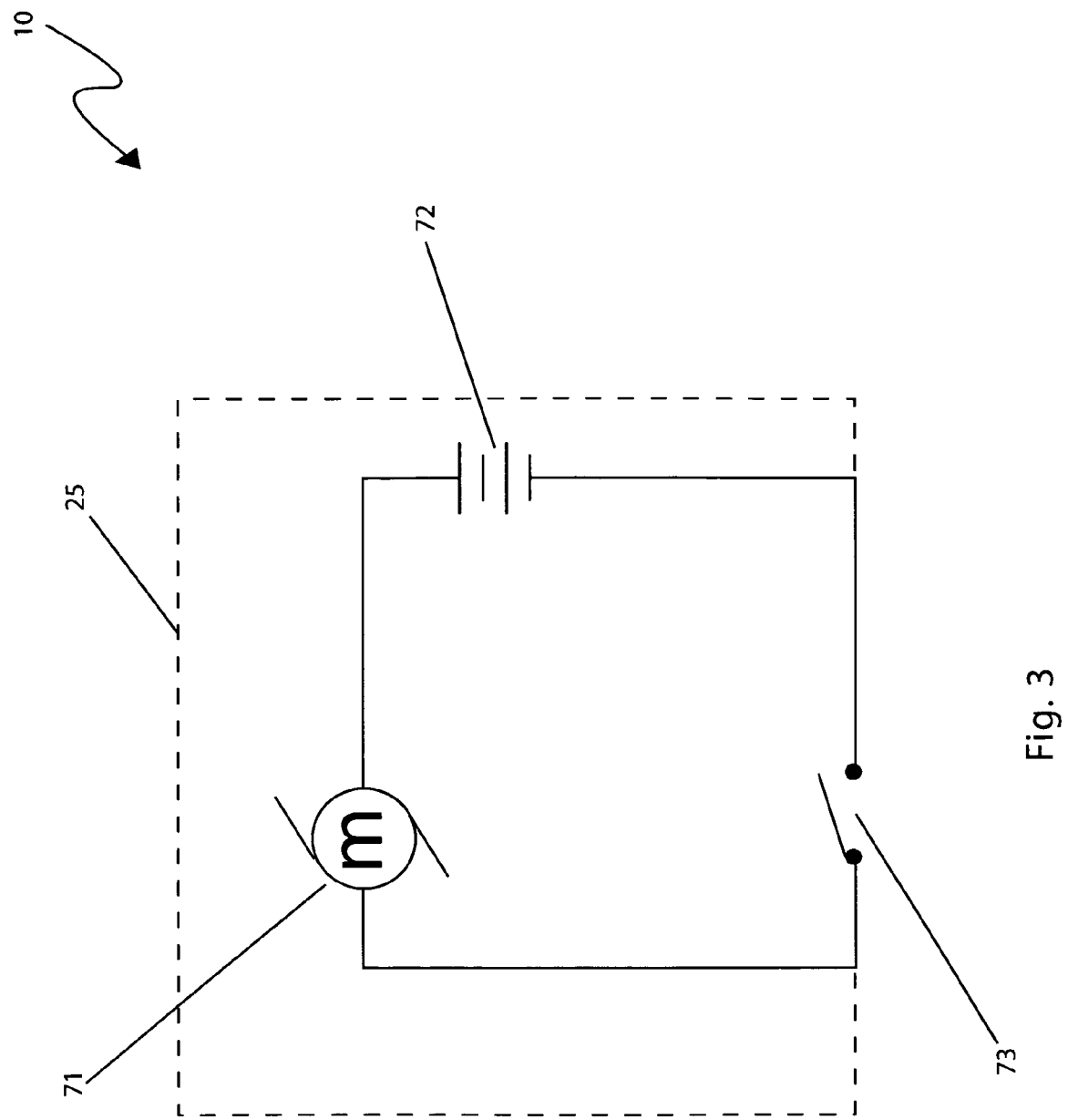

The best mode for carrying out the invention is presented in terms of its preferred embodiment, herein depicted within FIG. 1 and presented in terms of an alternate embodiment in FIGS. 2 and 3. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an apparatus and method for a windshield ice scraper with a de-icing solution dispenser (herein described as the "apparatus") 10, which provides a means for an apparatus 10 to aid in the removal of ice buildup from motor vehicle windshields. The apparatus 10 comprises a conventional ice scrapping blade 35 with an integral spray nozzle 55 for dispensing de-icing solution 56. The handle 20 of the apparatus 10 comprises an internal reservoir 50 filled with de-icing solution 56 and a spray pump trigger 45 providing a spraying means thereto solution 56 upon a windshield to aid in a de-icing task. A threaded reservoir cap 51, located on the handle 20, is used to refill the invention 10 when the reservoir 50 is depleted. A removably attachable snow brush 60 is also provided.

Referring now to FIG. 1, a perspective view of the apparatus 10, according to the preferred embodiment of the present invention, is disclosed. The apparatus 10 comprises a handle 20, a snow brush 60, a first shaft section 25, a second shaft section 30, and a scraping blade 35.

The handle 20 further comprises a reservoir 50, a spray trigger 45, a reservoir orifice 41, and a reservoir cap 51. The handle 20 provides a cylindrical hard plastic enclosure further providing a manual gripping means to the apparatus 10 being covered over with a soft rubber or plastic material providing a firm grip in wet or dry conditions. The handle 20 is envisioned to be a hollow vessel providing an internal reservoir 50. The reservoir 50 provides a sealed containment to a volume of de-icing solution 56 via a threaded reservoir orifice 41 and reservoir cap 51 located upon an external surface at a distal end. The reservoir orifice 41 is used to refill the reservoir 50 when the de-icing solution 56 is depleted. The reservoir 50 is in fluid communication with a manual spray trigger 45 located at a proximal position thereupon said handle 20 being convenient to a user's index finger. The spray trigger 45 provides a pressure source to said solution 56 using a pressure bulb or pumping device similar to common household cleanser spray bottles. The spray trigger 45 is in fluid communication with an internal coiled plastic tube 32 providing a fluid pressure thereto. The spray trigger 45 is envisioned to be preferably a hinged trigger with a spring return; however, any number of similar devices such as a push button or the like may be provided and as such should not be considered as a limiting factor of the invention 10. The handle 20 further comprises a female threaded region 66 at a distal end thereof to receive a male threaded region portion 65 of a removably attachable snow brush 60. The snowbrush 60 provides a convenient snow removal appliance and is envisioned to be made using plastic or metal materials providing uni-directional bundled synthetic bristles in an expected manner. The handle 20 also provides a permanent attachment means at a proximal end to a first shaft section 25.

The first shaft section 25 comprises a tubular member being slidingly engaged therewith a second shaft section 30 in a telescoping fashion. Both the first 25 and second 30 shaft sections have rectilinear shapes and comprise a tubular construction with an outside diameter of the second shaft section 30 particularly sized to fit snuggly and slidingly therein the first shaft section 25. The clamping collar 31 provides a locking and length adjustment means to the apparatus 10 and preferably comprises a common threaded collar type device similar to those used on photography tripods; however various types of tube securing designs common in the industry may be provided such as a friction collar, a cam lever, or the like and as such should not be interpreted as a limiting factor of the invention 10. The first shaft section 25 and second shaft section 30 are envisioned to be made using resilient lightweight water-proof plastic or metal thin-wall tubing. The second shaft section 30 further provides a permanent attachment means to the scraping blade 35. The first 25 and second 30 shaft sections provide a routing conduit means for a flexible solvent tube therein (not shown) to a spray nozzle portion 55 of the scraping blade 35. The scraping blade 35 is envisioned to be a plastic injection molded component comprising an integrally molded spray nozzle 55 located at a front lower surface. The spray nozzle 55 provides dispensing of de-icing solution 56 in a fanned dispersing pattern when pressurized thereby the aforementioned spray trigger 45. The scraping blade 35 is envisioned to be a conventional straight-edged and fan-shaped plastic blade.

The majority of the components used in the invention 10 are envisioned being made of plastic in an injection molding process; however, materials such as painted steel, stainless steel, or the like may be provided with equal benefit and as such should not be considered as a limiting factor of the invention 10.

Referring now to FIG. 2, a perspective view of a motorized pump embodiment 70 of the apparatus 10, according to an alternate embodiment of the present invention, is disclosed. The motorized pump embodiment 70 provides similar function and construction to that of the preferred embodiment 10 with particular enhancements to enable automatic dispensing of the de-icing solution 56 by pressing a push button switch 73. The motorized pump embodiment 70 comprises a motorized pump 71, a battery/compartment 72, and a pushbutton switch 73. The motorized pump 71 provides a pumping force thereto the de-icing solution 56 propelling said de-icing solution 56 toward the spray nozzle 55. The motorized pump 71 is envisioned to be a miniaturized DC motor and pump assembly similar to those used in automotive windshield wash reservoirs comprising fluid inlet and outlet orifices and being powered therefrom one (1) or more DC batteries 72. The motorized pump 71 is to be mounted internal thereto the second shaft section 30 in fluid communication thereto the coiled tube 32 and in electrical communication with said DC battery/compartment 72 and the push button switch 73. The battery/compartment 72 is to be made using similar materials as the second shaft section 30 being flush thereto an outer cylindrical surface of said second shaft section 30 being affixed using a common threaded fastener in an expected manner. The push button comprises a single contact closure type device with a spring return, thereby providing an electrical closure of an activation circuit, thereby providing a DC current thereto the motorized pump 71 (see FIG. 3).

Referring now to FIG. 3, an electrical block diagram of a motorized pump embodiment 70 of the apparatus 10, according to an alternate embodiment of the present invention, is disclosed. The motorized pump embodiment 70 is mounted internal thereto the first shaft section portion 25 of the apparatus 10 and is illustrated here depicting a simple DC circuit comprising one (1) or more rechargeable or disposable batteries 72 providing a direct current thereto a single contact closure push button switch 73 further comprising a spring return, thereby providing a momentary activation means thereto said DC current. Upon manual activation of said switch 73, DC power is conducted thereto a motor portion of the motorized pump 71 which provides sufficient torque and revolutions per minute (RPM) thereto an integral fluid pump so as to propel de-icing solution 56 (see FIG. 2). The circuit described herein also comprises electrical connections, electrical components, wiring, and the like in an expected manner.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be utilized as indicated in either FIG. 1 or 2.

The method of utilizing the preferred embodiment of the apparatus 10 may be achieved by performing the following steps: removing the reservoir cap 51; filling the reservoir 55 by pouring a desired volume of de-icing solution 56 into the reservoir 55 as required; replacing the reservoir cap 51 by turning in a clock-wise direction until tightened; installing the snow brush 60 by engaging and turning the male threaded region 65 thereinto the female threaded region 66 of the handle 20, if not previously installed; adjusting the overall length of the apparatus 10 using the clamp collar 31; loosening the clamp collar 31 by grasping and turning; extending the second shaft section portion 30 as desired; tightening the clamp collar 31; grasping the handle 20 in an expected manner; removing ice and snow from a windshield using the scraping blade portion 35; dispensing and dispersing the de-icing solution 56 by repeatedly depressing the spray trigger 45 as needed, thereby pressurizing and pumping the de-icing solution 56 from the reservoir 55 to the spray nozzle 55; scraping the windshield using the scraping blade 35 in conjunction with the dispersion of de-icing solution 56 until all ice and snow is removed from said windshield; utilizing the apparatus 10 as needed until the de-icing solution 56 is depleted therefrom the reservoir 55; refilling said reservoir 55 as described above; and, benefiting from improved visibility and time saved using the present invention 10.

The method of utilizing the alternate motorized pump embodiment 70 of the apparatus 10 may be achieved by performing the following additional steps: loading a fresh set of rechargeable or disposable batteries therein the battery compartment 72; dispensing and dispersing the de-icing solution 56 by depressing the push button switch 73, thereby activating the motorized pump 71 in turn propelling de-icing solution 56 therefrom the reservoir 55 thereto the spray nozzle 55.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. An ice scraping apparatus for removing ice buildup from an existing vehicle windshield, said ice scraping apparatus comprising:
   a first shaft section;
   a second shaft section adjustably coupled to said first shaft section and extending distally away therefrom;
   a handle located at a proximal end of said first shaft section;
   a snow brush removably conjoined directly to said handle;
   a blade conjoined to a distal end of said second shaft section;
   a de-icing solution housed within said handle; and,
   means for selectively dispensing said de-icing solution from said distal end of said second shaft section while said blade is engaged with the existing windshield;
   wherein said dispensing means comprises:
   a reservoir formed within said handle;
   a spray trigger coupled to said handle;
   a reservoir orifice formed in said handle;
   a reservoir cap removably connected to said orifice;
   a spray nozzle disposed at said distal end of said second shaft section; and,
   a tube coupled to said reservoir and said spray nozzle respectively;
   wherein said spray trigger is in fluid communication with said tube for providing pressure thereto and thereby causing said de-icing solution to travel within said tube and exit out from said spray nozzle respectively;
   wherein said spray trigger is located distally of said reservoir orifice and proximally of said handle respectively.

2. The ice scraping apparatus of claim 1, wherein said first and second shaft sections have rectilinear shapes aligned along a linear path.

3. The ice scraping apparatus of claim 1, further comprising: a clamping collar attached to said first and second shaft sections for locking said first and second shaft sections at selected positions.

4. An ice scraping apparatus for removing ice buildup from an existing vehicle windshield, said ice scraping apparatus comprising:
   a first shaft section;

a second shaft section adjustably coupled to said first shaft section and extending distally away therefrom, said first and second shaft sections being axially aligned to each other;

a handle located at a proximal end of said first shaft section;

a snow brush removably conjoined directly to said handle and protruding away therefrom;

a blade conjoined to a distal end of said second shaft section and being oppositely seated from said snow brush;

a de-icing solution housed within said handle; and, means for selectively dispensing said de-icing solution from said distal end of said second shaft section while said blade is engaged with the existing windshield;

wherein said dispensing means comprises:

a reservoir formed within said handle;

a spray trigger coupled to said handle;

a reservoir orifice formed in said handle;

a reservoir cap removably connected to said orifice;

a spray nozzle disposed at said distal end of said second shaft section; and, a tube coupled to said reservoir and said spray nozzle respectively;

wherein said spray trigger is in fluid communication with said tube for providing pressure thereto and thereby causing said de-icing solution to travel within said tube and exit out from said spray nozzle respectively;

wherein said spray trigger is located distally of said reservoir orifice and proximally of said handle respectively.

5. The ice scraping apparatus of claim 4, wherein said first and second shaft sections have rectilinear shapes aligned along a linear path.

6. The ice scraping apparatus of claim 4, further comprising: a clamping collar attached to said first and second shaft sections for locking said first and second shaft sections at selected positions.

* * * * *